United States Patent [19]

Nishimura et al.

[11] Patent Number: 4,574,925

[45] Date of Patent: Mar. 11, 1986

[54] MOTOR AND GEARING CONTROLS FOR TORQUE CONVERTER LOCK-UP CLUTCH

[75] Inventors: Sadanori Nishimura; Masaru Yamashita; Hiroyuki Shimada, all of Saitama, Japan

[73] Assignee: Honda Giken Kogyo Kabushiki Kaisha, Tokyo, Japan

[21] Appl. No.: 526,118

[22] Filed: Aug. 24, 1983

[30] Foreign Application Priority Data

Sep. 4, 1982 [JP] Japan ................................. 57-153377
Mar. 16, 1983 [JP] Japan ................................. 58-42403

[51] Int. Cl.$^4$ ...................... B60K 41/22; B60K 41/28; F16H 47/06
[52] U.S. Cl. ................................. 192/3.31; 192/0.052; 192/3.57; 74/877; 74/878; 74/732
[58] Field of Search ...................... 192/3.31, 3.3, 3.29, 192/3.28, 3.58, 0.052, 0.092, 0.076, 3.57, 103 R; 74/732, 733, 878, 877, 871, 870, 868, 867

[56] References Cited

U.S. PATENT DOCUMENTS

| | | | |
|---|---|---|---|
| 3,682,043 | 8/1972 | Bailey | 192/3.57 |
| 4,270,636 | 6/1981 | Sunohara et al. | 192/3.31 |
| 4,294,140 | 10/1981 | Iwanaga et al. | 192/3.31 |
| 4,349,088 | 9/1982 | Ito et al. | 192/3.3 |
| 4,391,166 | 7/1983 | Kubo et al. | 192/3.31 |
| 4,431,096 | 2/1984 | Kobayashi et al. | 192/3.57 |

FOREIGN PATENT DOCUMENTS 0044487  1/1982  European Pat. Off. .
1483032  8/1977  United Kingdom .

Primary Examiner—George H. Krizmanich
Attorney, Agent, or Firm—Lyon & Lyon

[57] ABSTRACT

A control system for the clutch of a torque converter to allow direct drive operation of the torque converter in more than one transmission drive train speed level. The fluid pressure normally causing coupling of the clutch is interrupted by a blocking device when a change in drive trains occurs resulting in a lower fluid pressure on one of the drive train operating clutches, and that interruption is prolonged by delaying either the imposition of the high fluid pressure on the blocking device in one embodiment or the imposition of the fluid pressure on the clutch in another embodiment.

17 Claims, 4 Drawing Figures

MOTOR AND GEARING CONTROLS FOR TORQUE CONVERTER LOCK-UP CLUTCH

The present invention relates to a clutch operation control system for the fluid torque converter of a vehicular transmission, in which the output torque of an engine is transmitted to the drive wheels of a vehicle through a fluid torque converter and through an auxiliary transmission equipped with plural driving trains.

A torque converter of this type is disclosed in U.S. Pat. No. 3,252,352, for example, in which, in order to improve the fuel economy while preventing the slip of the fluid torque converter during a high-speed cruising or the like, the torque converter is equipped with a clutch made operative to mechanically connect the input and output sides thereof so that said clutch is actuated at vehicular speeds higher than a predetermined value by a control valve controlled by a vehicular speed signal corresponding to the vehicular speed. In that system, however, the vehicular speed signal is fed to said control valve, only when the driving trains of the highest-speed step of the auxiliary transmission is established, so that said clutch is actuated only at a value above a predetermined value when the highest speed driving train is established. The operating region of that prior art clutch is remarkably restricted, and, in order to further improve the fuel economy, it is desirable for the clutch be operated even when a lower speed driving train is established. However, when the clutch is operated over the plural driving trains, a shift may occur while the clutch is in its operating state thereby intensifying the shift shock.

The present invention has an object to provide a torque converter clutch system which can operate in more than one drive train speed level and wherein the clutch is released during shifting between drive train speed levels. Specifically, it is an object of this invention to provide such a system wherein a vehicular speed signal blocking device is made operative when both the fluid supply pressures to the respective fluid pressure engagement elements of at least two high-speed driving trains are lower than a predetermined level thereby blocking the input of the vehicular speed signal to the control valve. A further object of this invention is to provide fluid flow restricting means in the system to provide an adequate time for shifting.

Another object of one embodiment of this invention is to provide means for delaying the vehicle speed signal input to the control valve to provide adequate time for shifting between drive train speeds with the clutch released.

Other and more detailed objects and advantages of this invention will appear from the accompanying drawings wherein.

Figure 1:
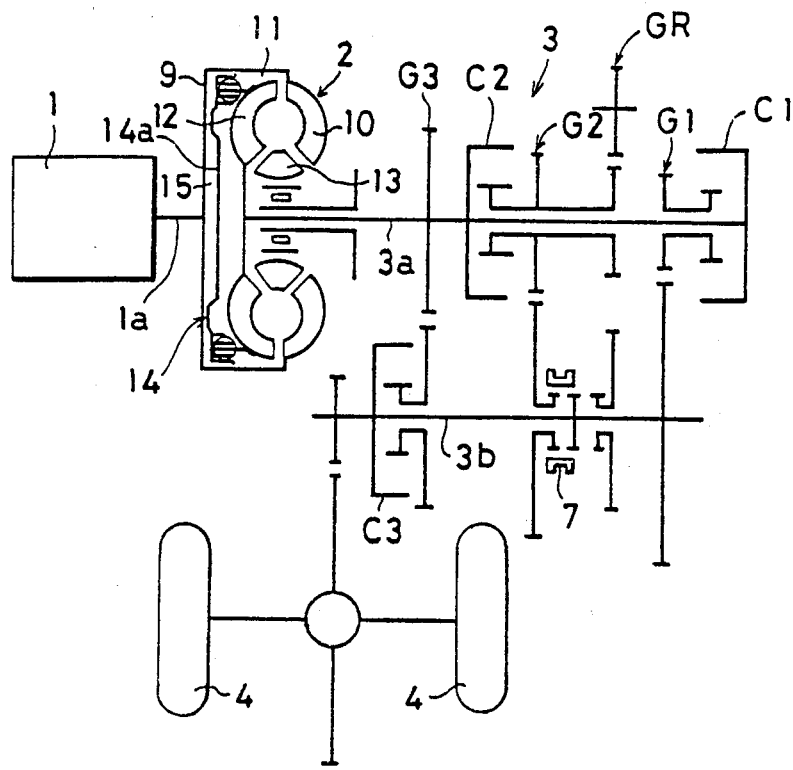
FIG. 1 is a diagrammatic illustration of a vehicle drive train arrangement employing this invention.

The overall arrangement of a vehicular transmission system is shown in FIG. 1, wherein the engine 1 is connected to the torque converter which connected to the auxiliary transmission 3 whereby the output torque from the engine 1 is transmitted through said torque converter 2 and said transmission 3 to the drive wheels 4 of a vehicle.

The transmission 3 illustrated is of the type made to effect shifts of three forward stages and one reverse stage although additional stages may be included, and is equipped with 1st, 2nd and 3rd speed forward driving trains G1, G2 and G3 and a reverse driving train GR between a driving shaft 3a connected to the torque converter 2 and a driven shaft 3b connected to the drive wheels 4. In the forward driving trains G1, G2 and G3, there are coupled 1st, 2nd and 3rd speed fluid pressure clutches C1, C2 and C3, respectively, acting as fluid pressure engagement elements, to which fluid pressure from a fluid pressure source 6 is supplied in a switchable manner, as will be described hereinafter, by the switching operations of a manual valve 5 shown in FIG. 2 so that said respective driving trains G1, G2 and G3 are selectively established, thus making said transmission 3 of semiautomatic type.

Figure 2:
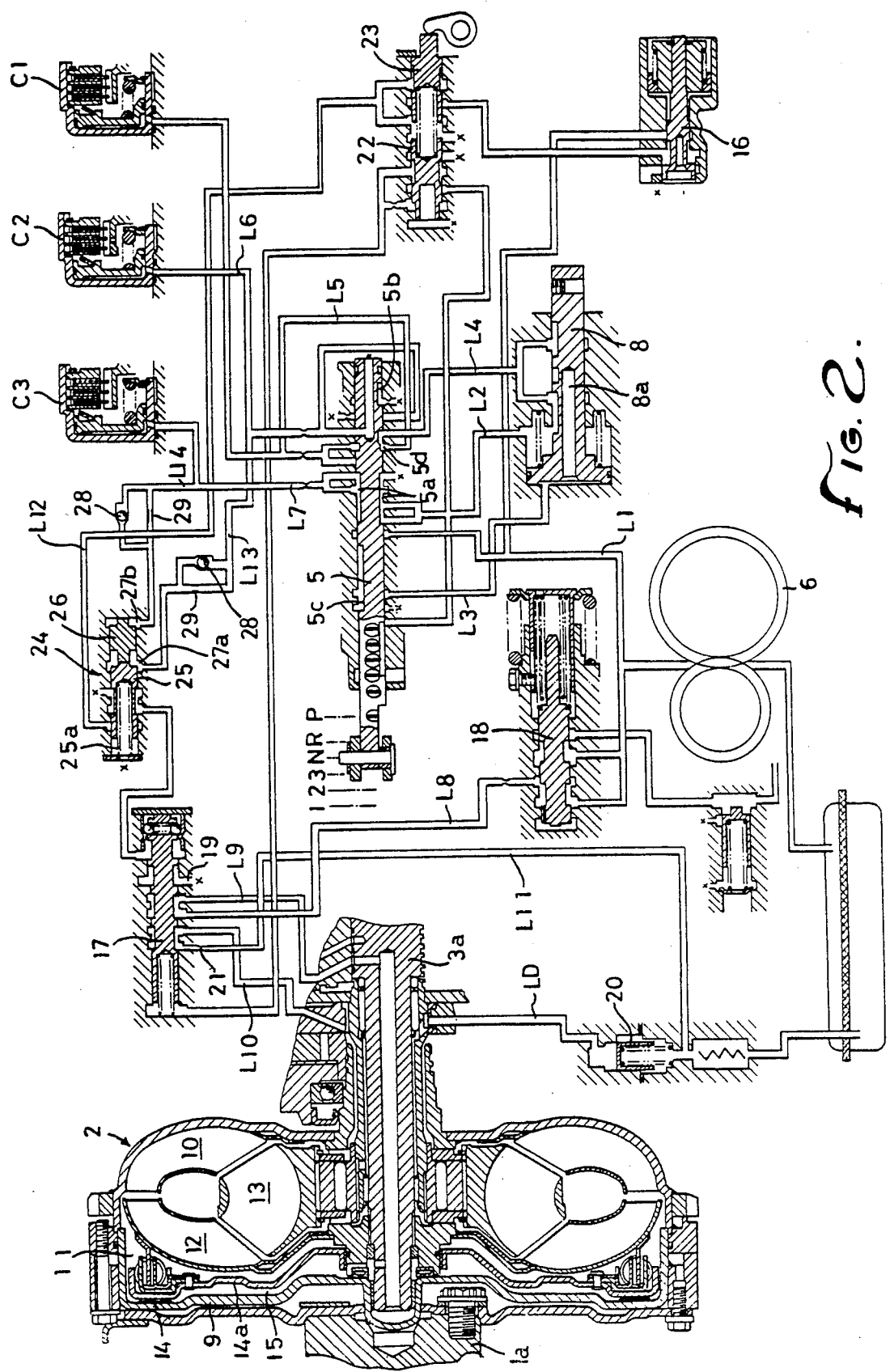
FIG. 2 is a hydraulic circuit diagram illustrating one embodiment of this invention.

The reverse driving train GR shares the 2nd speed fluid pressure clutch C2 with the 2nd speed forward driving train G2 so that it may be established by the switching operation of a selector gear 7, which is made operative to select between the forward and reverse driving trains G2 and GR, i.e., to the reverse side by movement rightwardly of the drawing. Said selector gear 7 is switched by a servo valve 8 which is shown in FIG. 2 for switching between the forward and reverse.

The construction of the manual valve 5 and servo valve 8 are well known in the art and only will be briefly described with reference to the drawings. The manual valve 5 can be switched among six positions, i.e., "1st speed", "2nd speed", "3rd speed", "N" for neutral, "R" for reverse drive and "P" for parking and is constructed to switch the connections of a 1st fluid line L1 leading from the fluid pressure source 6 to the 2nd and 3rd fluid lines L2 and L3 leading to the respective forward and reverse entrance ports of the servo valve 8, to a 4th fluid line L4 leading to the exit side of said servo valve 8, and to 5th, 6th and 7th fluid lines L5, L6 and L7 leading to the respective fluid pressure clutches C1, C2 and C3 of the 1st, 2nd and 3rd forward speeds. At the "1st speed" position, the 1st fluid line L1 and the 2nd fluid line L2 are connected through a 1st groove 5a, and the 4th fluid line L4 and the 5th fluid line L5 are connected through a 2nd groove 5b so that the pressure fluid from the fluid pressure source 6 is supplied to the 1st fluid pressure clutch C1 thereby to establish the 1st speed forward driving train G1. At the "2nd speed" position, the 6th fluid line L6 is switched and connected to the 4th fluid line L4 through the second groove 5b so that the 2nd speed forward driving train G2 is established by the fluid supply to the 2nd speed fluid pressure clutch C2. At the "3rd speed" position, the 7th fluid line L7 is connected to the 1st fluid line L1 in addition to the 2nd fluid line L2 through the first groove 5a so that the 3rd speed forward driving train is established by the fluid supply to the 3rd speed fluid pressure clutch C3. At the "R" position, on the other hand, the 1st fluid line L1 is switched and connected to the 3rd fluid line L3 through a third groove 5c thereby to push the servo valve 8 to the reverse side, i.e., rightwardly of the drawing so that the 4th fluid line L4 communicating with said 3rd fluid line L3 through the valve port 8a of said valve 8 is connected to the 6th fluid line L6 through a fourth groove 5d, whereby the reverse driving train GR is established both by the fluid supply to the 2nd speed fluid pressure clutch C2 and by switching the selector gear 7 to the reverse side.

The fluid torque converter 2 includes a chamber 11 formed by an input case 9 on one-side connected to the crankshaft 1a of the engine 1 and a pump vane 10 on the other side connected to the input case 9. A turbine vane 12 is connected to the draft shaft 3a of the transmission 3, and a stator vane 13 is interposed between the two vanes 10 and 12. A clutch 14 is provided for mechanically connecting and disconnecting the input and output side of said torque converter 2, e.g., the input case 9 to the turbine vane 12. When the clutch 14 is decoupled, a fluid torque transmission is established by the circulation of the internal fluid among the aforementioned vanes 10, 12 and 13. When the clutch 14 is coupled, a mechanical torque transmission is established through the clutch 14.

The clutch 14 may be any type of conventional clutch such as multi--disc friction clutch or a one-way clutch. In the illustrated embodiments of FIGS. 2 and 4, however, said clutch 14 is exemplified by a single-disc friction clutch which has its clutch disc 14a arranged in an axially movable manner in the space between the input case 9 and the turbine vane 12. The single-disc friction clutch 14 is switched into a decoupling condition, with the clutch disc 14a spaced from the side of the input case 9, by the supplying fluid to the inside of the fluid chamber 15 between said clutch disc 14a and the input case 9 and into a coupling condition, with the clutch disc 14a pushed by the internal pressure of the inside chamber 11 into fricational engagement with the input case 9, by discharging the fluid from said fluid chamber 15. The fluid supply and discharge to and from said fluid chamber 15 is switched by a control valve 17 which is controlled by the governor pressure from a governor valve 16 responsive to the vehicular speed, which pressure expresses the vehicular speed signal.

The control valve 17 can be switched between a clutch decoupling position (as shown), in which an 8th fluid line L8 for introducing the pressure fluid from the fluid pressure source 6 through a regulating valve 18 is connected with a 9th fluid line L9 leading to the fluid chamber 15 thereby to effect the fluid supply to said fluid chamber 15, and a clutch coupling position, in which said 9th fluid line L9 is connected to an atmospheric pressure discharge port 19 thereby to effect the fluid discharge from said fluid chamber 15. The control valve 17 is pushed by the aforementioned governor pressure to the clutch coupling position, i.e., leftwardly of the drawing. At a speed exceeding a predetermined vehicular speed, said control valve 17 is switched to the clutch coupling position to effect the coupling operation of the clutch 14.

In the coupling position, the pressurized fluid is supplied through the 8th fluid line L8 to a 10th fluid line L10 leading to the inside chamber so that the internal pressure of said chamber 11 is held at a relatively high level by a check valve 20 which is disposed in the discharge line LD from the chamber 11. In the decoupling position, the fluid supply to the chamber 11 is effected through the fluid chamber 15 and the fluid discharge is effected from the 10th fluid line L10 through an 11th fluid line L11, in which an orifice 21 is disposed, so that the internal pressure of the chamber 11 is set at a relatively low level.

On the other hand, the control valve 17 exerts the throttle pressure from a throttle valve 22, which responds to the throttle opening of the engine 1, against the aforementioned governor pressure so that the switch to the clutch coupling position will be effected at a higher vehicular speed in accordance with the increase in the throttle opening.

In a 12th fluid line L12 for introducing said governor pressure into said control valve 17, a valve mechanism is disposed at its upstream side and includes the actuating plunger 23 of said throttle valve 22. When the throttle opening is less than a predetermined value, the communication of said 12th fluid line L12 is blocked by said plunger 23 thereby interrupting the input of the governor pressure to said control valve 17. Thus during deceleration with the accelerator pedal being released, the control valve 17 is switched to the clutch decoupling position to release operation of the clutch 14 so that the transmission of the backward driving force from the drive wheels 4 to the engine 1 is not direct coupled through the clutch 14.

According to the present invention, moreover, there is provided a vehicular speed signal blocking device 24 which is made operative when the fluid supply pressures to the 2nd and 3rd fluid pressure clutches C2 and C3 acting as the respective fluid pressure engagement elements of at least two of the higher-speed drive trains G1, G2 and G3, e.g., the 2nd and 3rd speed forward driving trains G2 and G3, are both below the predetermined level to block the input of the governor pressure or the vehicular speed signal to the control valve 17.

The vehicular speed signal blocking device 24 may be comprised of a block valve 25 disposed in the 12th fluid line L12 and biased to the right toward the closed condition by the action of a spring 25a, and a plunger 26 which is juxtaposed at the right hand side of said block valve 25. The first port 27a at the left hand side of said plunger 26 is exposed to the fluid supply pressure from the 2nd speed fluid pressure clutch C2, i.e., the 2nd speed pressure through the 13th fluid line L13 branched from the 6th fluid line L6, whereas the second port 27b at the right hand side of said plunger 26 is exposed to the fluid supply pressure from the 3rd speed fluid pressure clutch C3, i.e., the 3rd speed pressure through the 14th fluid line L14 branch from the 7th fluid line L7. In each of said 13th and 14th fluid lines L13 and L14, furthermore, there are disposed a one-way valve 28 and an orifice 29 in parallel with each other.

The operation of the embodiment of FIG. 2 now will be described. When the 2nd speed forward driving train G2 is to be established, the block valve 25 is pushed leftward to the opened position by the action of the 2nd speed pressure to the 1st port 27a against the action of the spring 25a so that the governor pressure is applied through the 12th fluid line L12 to the control valve 17 thereby to effect the operation of the clutch 14 at a vehicular speed not below the predetermined value. When the 3rd speed forward driving train G3 is to be established, on the other hand, the block valve 25 is pushed leftward to the opened position through the plunger 26 by the action of the 3rd speed pressure to the second port 27b, thereby similarly to effect the operation of the clutch 14.

During a shift from the 2nd speed to the 3rd speed, said block valve 25 is closed to temporarily interrupt the operation of the clutch 14 during the time period from (a) the instant when the fluid discharge from the 6th fluid line L6 and the fluid supply to the 7th fluid line L7 are effected so that the fluid pressure applied to the 1st port 27a is dropped to a level lower than the predetermined pressure by the fluid discharge through the 13th fluid line L13 until (b) the instant when the fluid pressure applied to the 2nd port 27b is raised to a level higher than the predetermined pressure by the fluid supply through the 14 th fluid line L14.

At the shift from the 3rd speed to the 2nd speed, the fluid supply and discharge conducted are reversed from the aforementioned ones thereby to close said block valve 25 during the time period from the instant when the fluid pressure at port 27b becomes lower than the predetermined level to the instant when the fluid pressure at port 27a becomes higher than the predetermined level.

If, in this case, the respective 13th and 14th fluid lines L13 and L14 are equipped with the one-way valves 28 and the orifices 29, the pressure drop at the port on the fluid discharge side is relatively accelerated by the one-way valves 28 whereas the pressure rise at the port on the fluid supply side is relatively decelerated by the orifices 29. This is advantageous because it is possible to prolong the closed period of the block valve 25 during the shifting operation, i.e., the disengage condition of the clutch 14.

Figure 3:
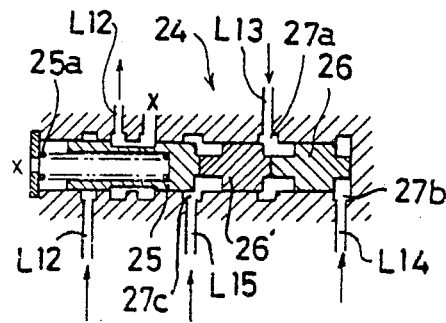
FIG. 3 is a sectional view of a modified form of signal blocking device for use in the system of FIG. 2.

The description thus far is directed to the embodiment of FIG. 2 in which the clutch 14 is actuated when the 2nd and 3rd speed forward driving trains G2 and G3 are established. However, in the event it is desired to operate the clutch 14 even when the 1st speed forward driving train G1 is established, the vehicular speed signal blocking device 24 is equipped with a second plunger 26, as shown in FIG. 3, between the block valve 25 and the aforementioned first plunger 26' so that the 1st speed pressure is applied to a third port 27c at the left hand side of said second plunger 26' through a 15th fluid line L15 branched from the 5th fluid line L5. Again the 2nd and 3rd speed signals are applied to the 1st and 2nd ports 27a and 27b at the both sides of the first plunger 26 through the 13th and 14th fluid lines L13 and L14 as in the previously described operations. In this embodiment, during the shift between the 1st and 2nd speeds, the block valve 25 is temporarily closed similar to closure during the shift between the 2nd and 3rd speeds by the fluid pressure changes of the 1st and 3rd ports 27a and 27c at both sides of the second plunger 26'.

Figure 4:
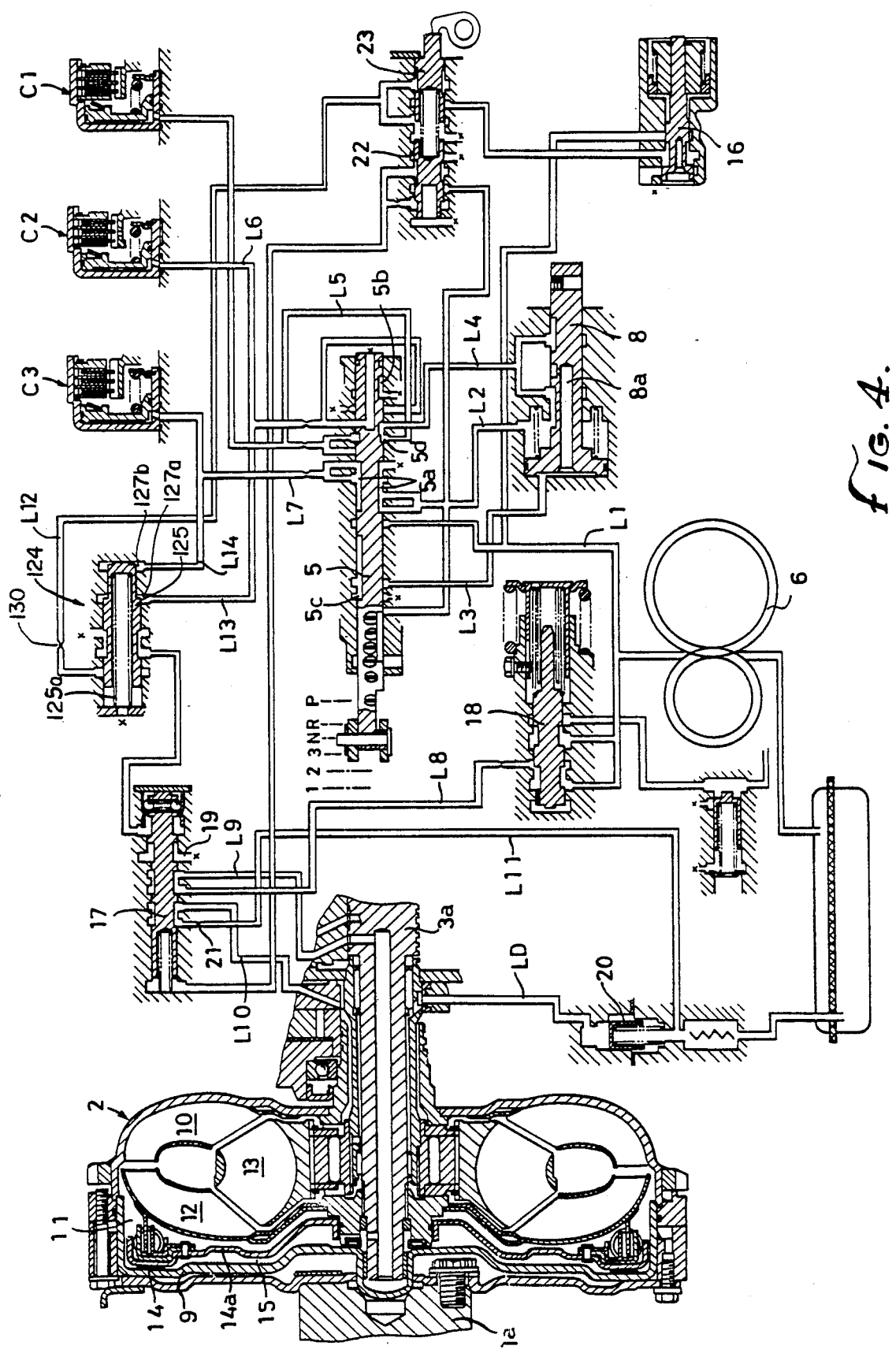
FIG. 4 is a hydraulic circuit diagram of another embodiment of this invention.

Referring now to FIG. 4, another but similar form of vehicular speed signal blocking device 124 is illustrated and includes a block valve 125 which is disposed in the 12th fluid line L12 so that it is pushed to the opened side, i.e., leftwardly of the drawing, by the respective fluid pressures against a spring 125a, which are to be applied to 1st and 2nd pilot ports 127a and 127b at the right hand side thereof. The fluid supply pressure to the 2nd speed fluid pressure clutch C2 is supplied through the 13th fluid line L13, which is branched from the 6th fluid line L6, to said 1st pilot port 127a and the fluid supply pressure to the 3rd speed fluid pressure clutch C3 is supplied through the 14th fluid line L14, which is branched from the 7th fluid line L7, to said 2nd pilot port 127b. As a result, when the 2nd and 3rd speed pressures are both lower than the predetermined level, the block valve 125 is closed by the elastic force of the spring 125a to block the input of the governor pressure to the control valve 17 so that said control valve 17 is switched to the clutch decoupling position thereby interrupting the operation of the clutch 14.

The construction and operation of this embodiment of FIG. 4 thus far described is not especially different from the above-described embodiments. However, in this embodiment there is disposed a delay means 130 for delaying the input of the vehicular speed signal to the control valve 17 through the vehicular speed signal blocking device 124 rather than delaying the operation of the blocking device of the previous embodiments. An orifice acting as the delay means 130 is disposed in the 12th fluid line L12 upstream of the block valve 125 of the blocking device 124.

In the embodiment of FIG. 4, when the 2nd speed forward driving train G2 is to be established, the block valve 125 is pushed leftward to the opened position by the action of the 2nd speed pressure to the 1st pilot port 125a against action of the spring 125a so that the governor pressure, acting as the vehicular speed signal, is applied through the 12th fluid line L12 to the control valve 17 thereby to effect the operation of the clutch 14 at a vehicular speed above the predetermined value. When the 3rd speed forward driving train G3 is to be established, on the other hand, the block valve 125 is opened in a similar manner as above by the input of the 3rd speed pressure to the second pilot port 125b thereby to effect the operation of the clutch 14 at a vehicular speed not lower than the predetermined level.

During the shift from the 2nd speed to the 3rd speed, for example, the block valve 125 is closed to block the input of the governor pressure to the control valve 17 and to temporarily interrupt the operation of the clutch 14 during the time period from (a) the instant when the fluid discharge from the 6th fluid line L6 and then the fluid supply to the 7th fluid line L7 are effected so that the 2nd speed pressure applied to the 1st pilot port 127a is dropped to a level lower than the predetermined pressure until (b) the instant when the 3rd speed pressure applied to the 2nd pilot port 127b is raised to a level higher than the predetermined pressure. However, with this embodiment of FIG. 4, even if the 3rd speed pressure to be applied to the second pilot port 127b rises relatively fast to a level above the predetermined value so that said block valve 125 is opened relatively quickly, the input of the governor pressure to the control valve 17 is delayed by the action of the orifice as the delay means 130 so that the clutch 14 is held for a while in its decoupled state even with said block valve 125 being opened thereby to prolong the decoupled condition time period so that any shift shock can be prevented as much as possible. At the shift from the 3rd speed to the 2nd speed, the operations similar to the aforementioned ones are attained although the fluid supply and discharge of the 6th and 7th fluid lines L6 and L7 are merely reversed.

In the foregoing embodiments, the auxiliary transmission 3 is described as being a semiautomatic type wherein the shifts are effected by the switching operations of the manual valve 5. However, the present invention is not limited thereto, but rather the auxiliary transmission 3 may be of the completely automatic type in which the automatic transmission is effected by the shift valve controlled by the governor pressure and the throttle pressure. Moreover, the present invention may be employed in an arrangement wherein the vehicular speed signal is not the governor pressure but an electric signal in which case it is sufficient that a delay circuit or the like using a resistor and a capacitor are used as the delay means.

Thus, according to the present invention, the direct drive features of a clutch in a torque converter may be utilized in plural drive train speed levels by the input of the vehicular speed signal to the control valve for controlling the operation of the clutch of the fluid torque converter being blocked by the vehicular speed signal blocking device, when the fluid supply pressures of the respective fluid pressure engagement elements of the plural driving trains are all lower than predetermined levels, so that the operation of said clutch may be interrupted even when the vehicular speed is higher than the predetermined value. Also, the operation of the clutch during the shift is interrupted so that the shifting shock can be suppressed and the clutch is operated when the respective establishments of the plural driving trains are effected so that the fuel economy can be remarkably improved. In one form of the present invention, there is provided a delay means for delaying the input of the vehicular speed signal to the control valve through the vehicular speed signal blocking device thereby to prolong the decoupled condition of the clutch. The one common delay means can cope with any shift between the plural driving trains for actuating the clutch.

We claim:

1. A clutch operation control system for a torque converter clutch of a vehicle transmission with shifting means and plural drive trains selectively operated by fluid pressure engagement elements for shifting between drive trains, in which a control valve supplies fluid pressure to the clutch for operating the clutch and a vehicle speed related pressure signal is supplied to the control valve for causing actuation of the control valve to couple the clutch at elevated pressure of said speed related pressure signal, comprising, means for blocking the said speed related fluid pressure signal during shifting between drive trains including means separately responsive to the fluid pressures on each of at least two of the drive train pressure engagement elements to open the blocking means upon the fluid pressure on one of said drive train pressure engagement elements exceeding a predetermined level.

2. A clutch operation control system for a torque converter clutch of a vehicle transmission with shifting means and plural drive trains selectively operated by fluid pressure engagement elements for shifting between drive trains, in which a fluid pressure signal is related to vehicle speed and a control valve is actuated by elevated levels of said fluid pressure signal for supplying fluid pressure to the clutch for operating same, comprising, means for blocking the said speed related fluid pressure signal including means responsive to the fluid pressures on each of at least two of the drive train pressure engagement elements to open the blocking means upon the fluid pressure on one of said drive train pressure engagement elements exceeding a predetermined level, said blocking means interrupting said clutch operating fluid pressure to uncouple the clutch during shifting between drive trains.

3. A clutch operation control system for a torque converter clutch of a vehicle transmission with shifting means and plural drive trains selectively operated by fluid pressure engagement elements for shifting between drive trains, in which a fluid pressure related to vehicle speed actuates a control valve for supplying fluid pressure to the clutch for operating same at elevated pressures of said speed related fluid pressure, comprising, means for blocking the said speed related fluid pressure including means separately responsive to the fluid pressures on each of at least two of the drive train pressure engagement elements to open the blocking means upon the fluid pressure on one of said drive train pressure engagement elements exceeding a predetermined level, and means for delaying the reapplication of said speed related fluid pressure related to vehicle speed actuates a control valve for supplying fluid pressure to the clutch for operating same at elevated pressures of said speed related fluid pressure, comprising, means for blocking the said speed related fluid pressure including means separately responsive to the fluid pressure on each of at least two of the drive train pressure engagement elements to open the blocking means upon the fluid pressure on one of said drive train pressure engagement elements exceeding a predetermined level, and means for delaying the reapplication of said speed related fluid pressure beyond the instant the fluid pressure increases in the drive train pressure engagement element above said predetermined level for delaying recoupling of the clutch during shifting between drive trains.

4. A clutch operation control system for a torque converter clutch of a vehicle transmission with shifting means and plural drive trains selectively operated by fluid pressure engagement elements for shifting between drive trains, in which a fluid pressure related to vehicle speed actuates a control valve for supplying fluid pressure to the clutch for operating same at elevated pressures of said speed related fluid pressure, comprising, means for blocking the said speed related fluid pressure including a valve means normally biased to a blocking position and responsive to the fluid pressures on each of at least two of the drive train pressure engagement elements to move said valve means to an open position upon the fluid pressure on one of said drive train pressure engagement elements exceeding a predetermined level, and means for delaying the reapplication of said speed related fluid pressure beyond the instant the fluid pressure increases in the drive train pressure engagement element above said predetermined level for delaying recoupling of the clutch during shifting between drive trains.

5. The control system of claim 4 in which said delaying means includes fluid flow restricting means between said valve means and the drive train pressure engagement elements to slow the application of the pressure on the valve means.

6. The control system of claim 5 in which said flow restricting means includes means for allowing rapid flow from said valve means toward the drive train pressure engagement elements to allow rapid movement of the valve means toward the blocking position.

7. The control system of claim 4 in which said delaying means includes a flow restricting means for restricting the flow of said related fluid pressure to the control valve.

8. The control system of claim 7 in which said flow restricting means comprises an orifice located between the source of the speed related pressure and the valve means.

9. The control system of claim 4 in which said valve means includes a first plunger slidable between blocking and open positions and a second plunger for engaging the first plunger and first and second port means located on either end of said second plunger for separately communicating with two different drive train pressure engagement elements for independently actuating said first plunger.

10. The control system of claim 9 in which a third plunger engages the second plunger on the end opposite the first plunger, and a third port means is located at the end of the third plunger remote from the second plunger and communicates with a third drive train pressure engagement element allowing clutch coupled operation in any one of three drive train selections.

11. A clutch operation control system for a fluid torque converter of a vehicular transmission, in which output torque of an engine is transmitted to drive wheels of a vehicle through a fluid torque, converter and an auxiliary transmission equipped with plural driving trains and a shifting means with the respective driving trains selectively established by fluid pressure supplied to respective fluid pressure engagement elements corresponding thereto, and in which the torque converter is equipped with a clutch made operative to mechanically connect input and output sides thereof with the clutch being actuated at vehicular speeds higher than a predetermined value by a control valve actuated by a vehicular speed signal corresponding to vehicular speed, comprising, a vehicular speed signal blocking device having means responsive to fluid supply pressures to the respective fluid pressure engagement elements of at least two of said driving trains to block input of said vehicular speed signal to said control valve upon all of those said fluid supply pressures being below a predetermined level and unblocking said input upon any one of those said fluid supply pressures exceeding said predetermined level corresponding to shifting to that drive train, and means for delaying the input of said vehicular speed signal to said control valve through said vehicular speed signal blocking device beyond the instant of said shifting for uncoupling the clutch during shifting.

12. A clutch operation control system for a fluid torque converter of a vehicular transmission, in which output torque of an engine is transmitted to drive wheels of a vehicle through a fluid torque converter and an auxiliary transmission equipped with plural driving trains and shifting means with the respective driving trains selectively established by fluid pressure supplied to respective fluid pressure engagement elements corresponding thereto, and in which the torque converter is equipped with a clutch made operative to mechanically connect input and output sides thereof with the clutch being actuated at vehicular speeds higher than a predetermined value by a control valve actuated by a vehicular speed signal corresponding to a vehicular speed, comprising, a vehicular speed signal blocking device having means responsive to fluid supply pressures to the respective fluid pressure engagement elements of at least two of said driving trains to block input of said vehicular speed signal to said control valve upon all of those said fluid supply pressures being below a predetermined level and unblocking said input upon any one of those said fluid supply pressures exceeding said predetermined level corresponding to shifting to that drive train, and means for restricting the flow of fluid from each of those said fluid supply pressures to said blocking device to delay the operation of the blocking device and in turn the input of said vehicular speed signal to said control valve through said vehicular speed signal blocking device beyond the instant of said shifting for uncoupling the clutch during shifting.

13. A clutch operation control system for a fluid torque converter of a vehicular transmission, in which output torque of an engine is transmitted to drive wheels of a vehicle through a fluid torque converter and an auxiliary transmission equipped with plural driving trains and shifting means with the respective driving trains selectively established by fluid pressure supplied to respective fluid pressure engagement elements corresponding thereto, and in which the torque converter is equipped with a clutch made operative to mechanically connect input and output sides thereof with the clutch being actuated at vehicular speeds higher than a predetermined value by a control valve actuated by a vehicular speed signal pressure corresponding to vehicular speed, comprising, a vehicular speed signal blocking device having means responsive to fluid supply pressures to the respective fluid pressure engagement elements of two or more of said driving trains to block input of said vehicular speed signal pressure to said control valve upon said two or more fluid supply pressures being below a predetermined level and unblocking said input upon any one of said two or more fluid supply pressures exceeding said predetermined level corresponding to shifting to that drive train, and means for restricting the flow of the said vehicular speed signal pressure to said control valve upon the opening of said vehicular speed signal blocking device to delay the actuation of the control valve beyond the instant of said shifting for uncoupling the clutch during shifting.

14. A clutch operation control system for a fluid torque converter of a vehicular transmission, in which output torque of an engine is transmitted to drive wheels of a vehicle through a fluid torque converter and an auxiliary transmission equipped with plural driving trains and shifting means with the respective driving trains selectively established by fluid pressure supplied to respective fluid pressure engagement elements corresponding thereto, and in which the torque converter is equipped with a clutch made operative to mechanically connect input and output sides thereof with the clutch being actuated at vehicular speeds higher than a predetermined value by a control valve actuated by a vehicular speed signal pressure corresponding to vehicular speed, comprising, a vehicular speed signal blocking device having slidable plunger means normally biased to a position for blocking the speed signal pressure input to the control valve and responsive to fluid supply pressures to the respective fluid pressure engagement elements of at least two of said driving trains to unblock said input upon one of said fluid supply pressures exceeding a predetermined level corresponding to shifting to that drive train, said plunger means having longitudinally separate portions for communicating with the separate fluid supply pressures, and flow restricting means for delaying the input of said vehicular speed signal to said control valve through said vehicular speed signal blocking device beyond the instant of said shifting for uncoupling the clutch during shifting.

15. The control system of claim 14 in which said plunger means is comprised of at least two separately slidable plungers and a fluid port is provided adjacent the end of each plunger for communicating with a separate one of the supply pressures.

16. The control system of claim 15 in which said flow restricting means includes a separate supply line for each said supply pressure and each said line includes an orifice and a one way by-pass means around the orifice to allow fluid to rapidly discharge from the blocking device and be slowly supplied to the blocking device.

17. The control system of claim 14 in which said flow restricting means includes an orifice means for restricting the vehicular speed signal pressure to the control valve.

* * * * *

UNITED STATES PATENT AND TRADEMARK OFFICE
CERTIFICATE OF CORRECTION

PATENT NO. : 4,574,925

DATED : March 11, 1986

INVENTOR(S) : S. Nishimura et al.

It is certified that error appears in the above-identified patent and that said Letters Patent is hereby corrected as shown below:

Column 8, line 51 after "said" insert --speed--.

Column 9, line 7 delete the comma between torque and converter.

Signed and Sealed this

Fourteenth Day of October, 1986

[SEAL]

*Attest:*

DONALD J. QUIGG

*Attesting Officer*   *Commissioner of Patents and Trademarks*